US008583413B2

(12) United States Patent
Elaasar (10) Patent No.: US 8,583,413 B2
(45) Date of Patent: Nov. 12, 2013

(54) COMPUTER METHOD AND APPARATUS FOR CHAINING OF MODEL-TO-MODEL TRANSFORMATIONS

(75) Inventor: Maged E. Elaasar, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 11/951,090

(22) Filed: Dec. 5, 2007

(65) Prior Publication Data

US 2009/0150125 A1    Jun. 11, 2009

(51) Int. Cl.
*G06F 9/45* (2006.01)
*G06F 9/455* (2006.01)

(52) U.S. Cl.
USPC .......................................... 703/22; 717/136

(58) Field of Classification Search
None
See application file for complete search history.

(56) References Cited

PUBLICATIONS

Yu et al. "Model Transformations from a Data Parallel Formalism towards Synchronous Languages", Sep. 2007, 46 pages.*
Bull et al. "An Architecture to Support Model Driven Software Visualization", 2006, Proceedings of the 14th IEEE International Conference on Program Comprehension, 5 pages.*
Mens et al. "A Taxonomy of Model Transformations", 2005, Dagstuhl Seminar Proeedings, 10 pages.*
Vanhooff et al. "UniTI: A Unified Transformation Infrastructure", ACM 10th Conference MoDELS, Oct. 3, 2007, 15 pages.*
Czarnecki, K., et al., "Feature-Based Survey of Model Transformation Approaches," *IBM Systems Journal*, vol. 45(3): pp. 612-646, (2006).
IBM Rational Software Architect Version 7.0. http://www-1.ibm.com/support/docview.wss?rs=2044&uid=swg24013690, Release Date (Dec. 5, 2006).
Swithinbank, M., et al., "Patterns: Model-Driven Development Using IBM Rational Software Architect (Section 9.5.2)", *IBM Redbooks*. http://www.redbooks.ibm.com/redbooks/pdfs/sg247105.pdf.

* cited by examiner

*Primary Examiner* — Suzanne Lo
(74) *Attorney, Agent, or Firm* — Hamilton, Brook, Smith & Reynolds, P.C.

(57) ABSTRACT

Computer method, apparatus and system chains model-to-model transformations. In a series of model transformations, there are respective bridges before and after each model transformation. For each pair of consecutive model transformations in the series, the respective bridge (i) receives a model output from a first model transformation of the pair, the received model being in the respective output model format of the first model transformation of the pair, (ii) prepares the received model as input to a second model transformation of the pair, including preparing the received model to be in the respective input model format of the second model transformation of the pair, and (iii) inputs the prepared model to the second model transformation of the pair. The series of model transformations and respective bridges provide chaining of the model-to-model transformations. Each model transformation in the series is able to be separately configured.

20 Claims, 8 Drawing Sheets

COMPUTER METHOD AND APPARATUS FOR CHAINING OF MODEL-TO-MODEL TRANSFORMATIONS

BACKGROUND OF THE INVENTION

Model-driven architecture (MDA) is an approach to software development advocated by the Object Management Group (OMG). It provides a set of guidelines for structuring specifications in the form of models. The approach suggests describing a system's specifications using a platform independent model (PIM). A PIM is usually specified in a language defined using the Meta Object Facility (MOF) by OMG. Once a system has been specified using a PIM, a platform is then chosen to realize it, producing what is referred to as a platform specific model (PSM). The process of going from a PIM to a PSM is called model-to-model transformation and can usually be automated. In fact, several model-to-model transformations may be needed to take the initial PIM through intermediate models to the ultimate PSM. This effectively creates a transformation chain.

The traditional way to implement transformation chains is by making every transformation implementation aware of the next transformation in the chain so it can properly pass its output as an input to the next transformation. However, tying the two transformations together reduce the possibility of reusing each transformation individually and the possibility of configuring each of them in different chains.

Another problem here is that transformations may be designed in some ways that complicate chaining. For example, some transformations might not clearly separate their inputs from their outputs (like those changing the input models directly). Others may have built-in post-processing (like serializes their results), which is typically done only if the transformation is a terminal one.

What is needed is a flexible pattern for chaining transformations, guidelines for structuring transformations to make them chainable and a framework for configuring such transformation chains.

SUMMARY OF THE INVENTION

The present invention addresses the forgoing short comings of the prior art. In particular, the present invention proposes a solution to chain model-to-model transformations that eliminates the need for inter-transformation dependencies and facilitates reuse. The invention solution in a nutshell is to implement bridges between transformations. A bridge is a chaining link that performs a small common task and has a precise interface in terms of its inputs and outputs. The main transformations are then structured to conform to that interface, i.e. accept the outputs of one bridge as their input, and produces the inputs expected by another bridge as their output.

The present invention also proposes a framework for configuring transformation chains as a sequence of transformations and bridges, each with its own configuration. In one embodiment, the invention applies the proposed design to Ecore-based model-to-model transformations.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
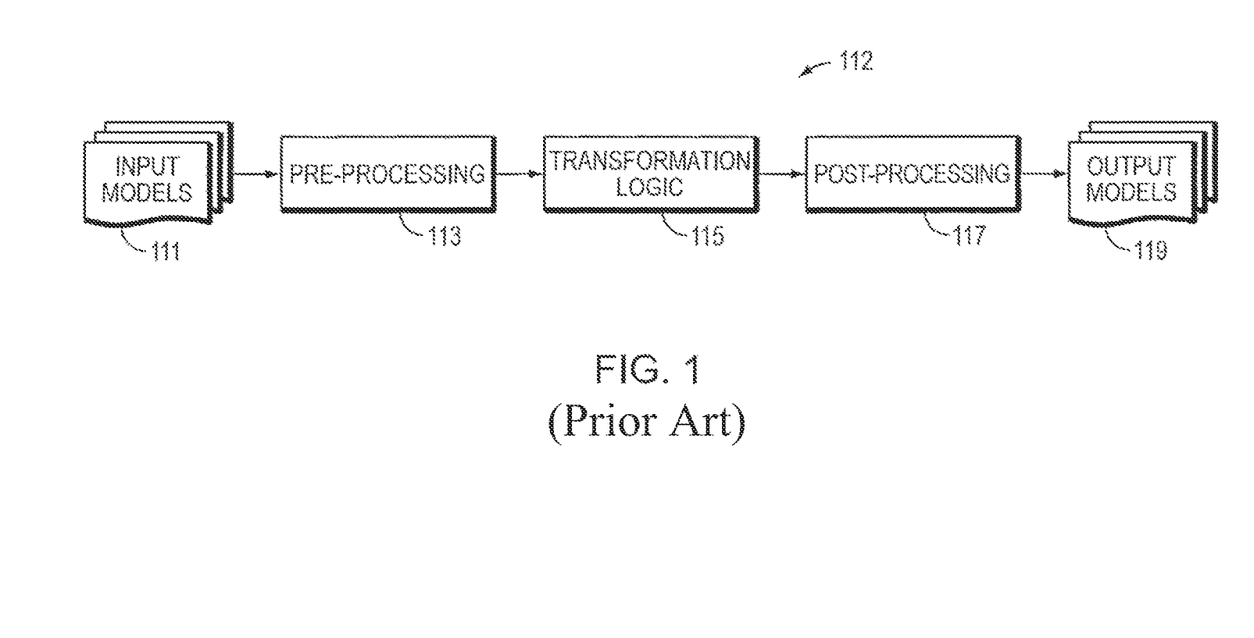
FIG. 1 is a block diagram of a typical monolithic model-to-model transformation.
Figure 2:
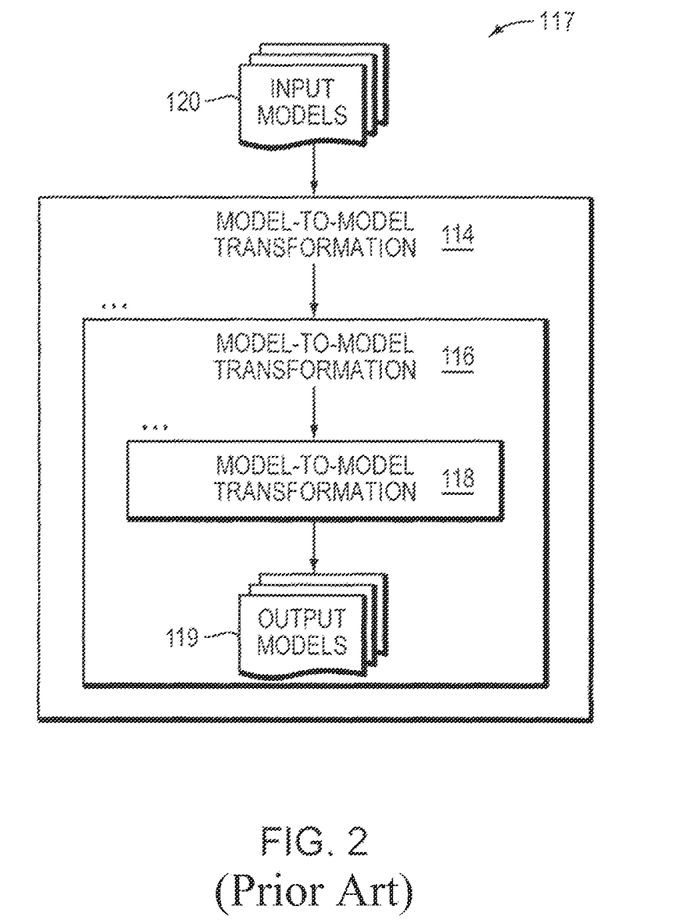
FIG. 2 is a schematic illustration of typical chaining of model-to-model transformations using post-processing phases.

A typical monolithic transformation 112 takes the input models 111, pre-processes 113 them, applies the transformation logic 115, and then post-processes 117. The result produces the output models 119. FIG. 1 shows such a typical monolithic transformation approach 112. Note that the shaded parts (namely pre-preprocessing 113 and post-processing 117) should not strictly be part of the transformation 112 but rather part of the reusable or global chain processing steps. For example, the pre-processing phase 113 of input models 111 usually involves loading them from their storage into memory, which usually needs to be done only by the first transformation in a chain. The same argument applies for the post-processing phase 117, which typically runs after the last transformation in the chain and involves saving the in-memory output models 119 into storage, merging them into other models or invoking other (model-to-model or model-to-text) transformations 114, 116, 118 with them. FIG. 2 shows a typical chaining of model-to-model transformations 114, 116, 118 in post-processing phase 117.

In FIG. 2, the output models of the last transformation in a chain serve as input models 120 to the post-processing phase 117. In the post-processing phase, 117, a first model-to-model transformation 114 in a chain of transformations is applied to the input models 120. The resulting models output from first transformation 114 are received as input for next in succession transformation 116, and so on. The last in the chain/series of transformations (e.g., transformation 118) produces final output models 119.

Figure 3:
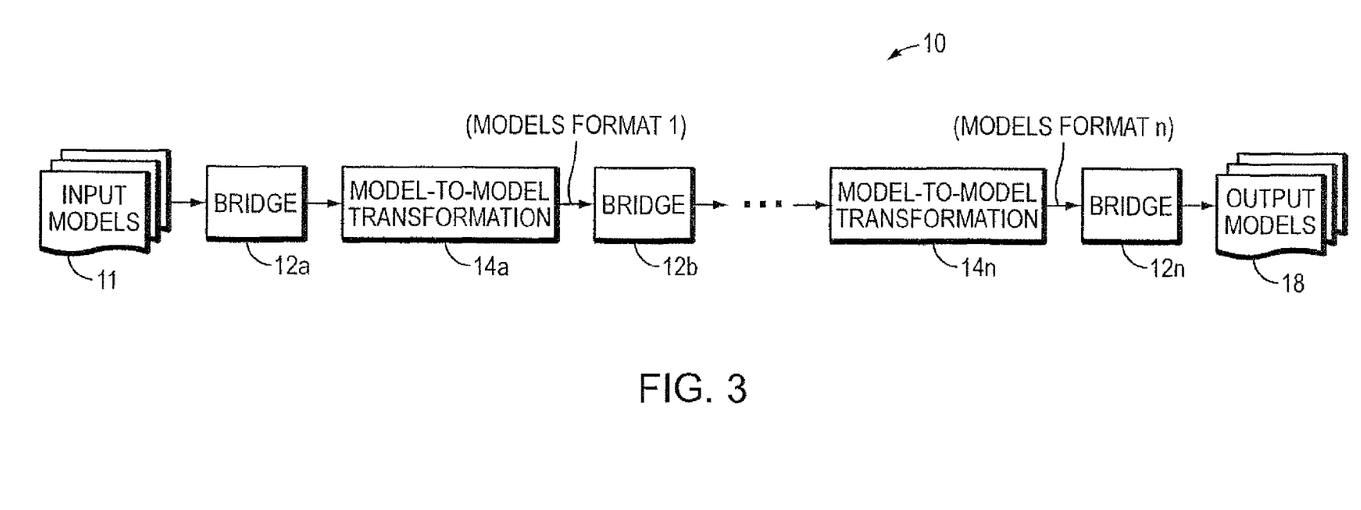
FIG. 3 is a block diagram of a model-to-model transformation chain of the present invention.

The present invention system 10 suggests separating those pre- and post-processing phases 113, 117 from a monolithic transformation 112 and repackaging them as bridges 12a, b, . . . n (FIG. 3). in a transformation chain. A bridge 12 is a unit in a transformation chain that accepts the output of a previous transformation 14a and prepares it as an input to a following transformation 14b . . . n. In a model-to-model transformation chain, the inputs and outputs of transformations 14 are typically models. Starting with an input set of models 11, the models get transformed as they make their way through the transformation chain (the series or sequence of bridges 12 and transformations 14). Specifically, the models are transformed from one format to another until they reach the output format, as shown in FIG. 3. The output models 18 result.

Various bridges 12 can be designed including: 1) a bridge that loads persisted input models 11 into memory, 2) a bridge that persists transformation 14 output models 18 to storage, 3) a bridge that merges transformation 14 output models 18 into persisted models, 4) a bridge that validates models, 5) a bridge that provides transformation 14 output models as input models to a consequent model-to-model transformation 14 and 6) a bridge that provides transformation 14 output models as input models to a model-to-text transformation 14. The model-to-model transformations 14 themselves can then be reduced to taking input models in a certain format and producing respective output models in another format (the output models can either be a different set or the same set with a different state).

Some other advantages can also be realized from designing a transformation chain in this fashion. The state of earlier links in the chain can be discarded as soon as the data flow reaches a new link in the chain, potentially leading to a more efficient execution. This can be contrasted to relying on monolithic transformations 112 doing the cleanup between the various phases on their own, which is error-prone.

Figure 4:
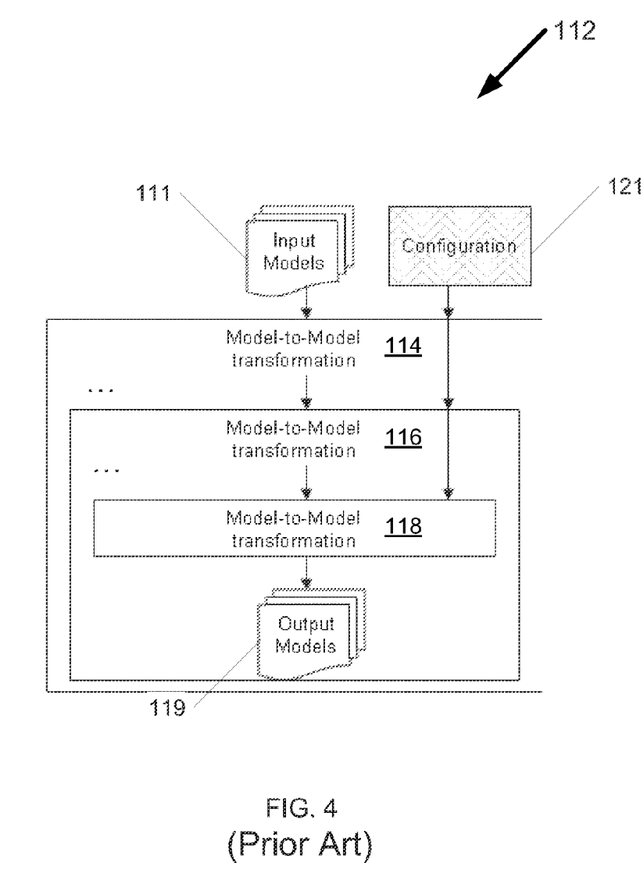
FIG. 4 is a schematic illustration of passing configurations through a typical monolithic transformation.
Figure 5:
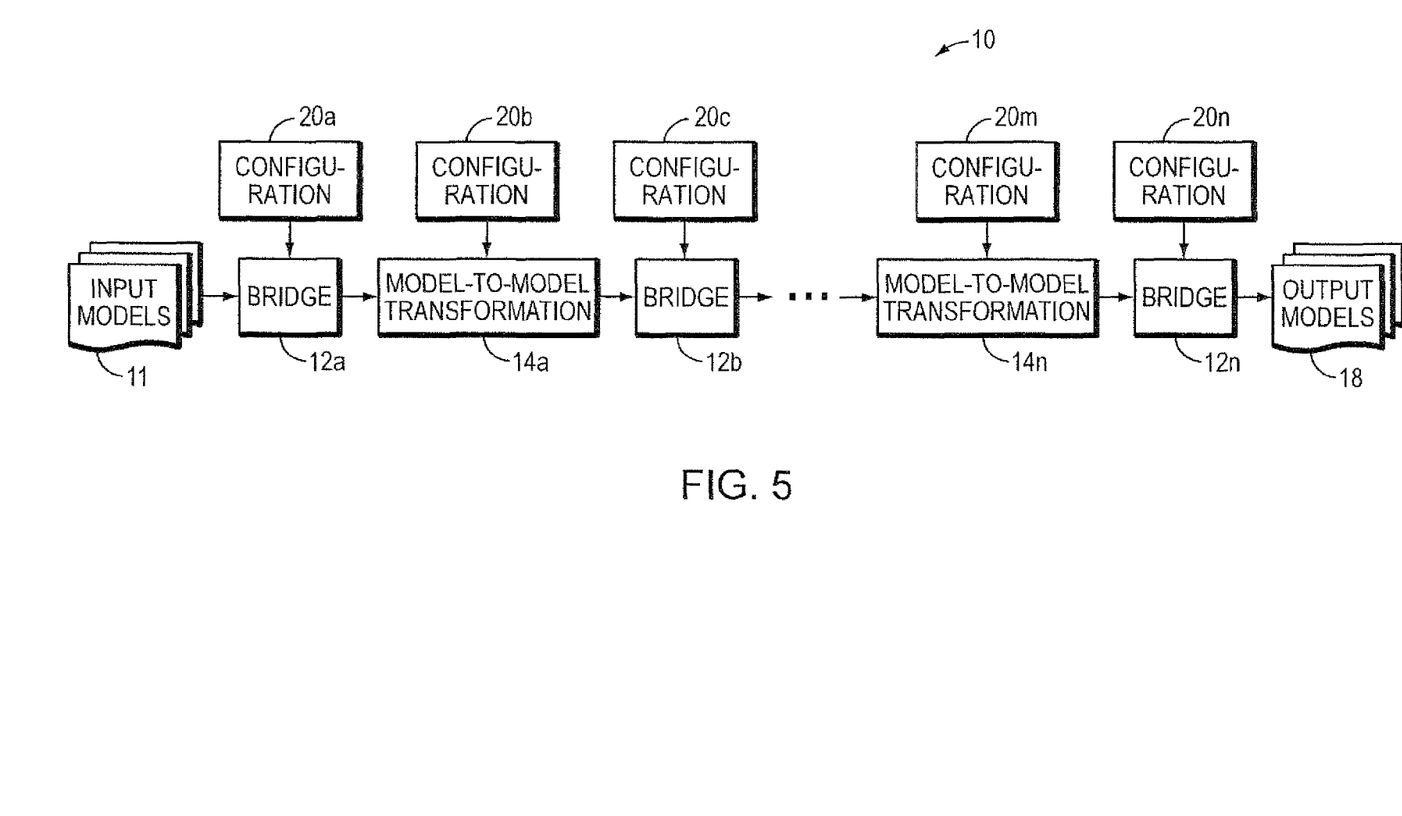
FIG. 5 is a schematic illustration of configurations in a transformation chain of the present invention.

Another advantage can be seen in configurability. A monolithic transformation 112 is provided with configuration parameters 121 for all nested transformations 114, 116, 118, which forces it to propagate those parameters down the hierarchy, as shown in FIG. 4. Meanwhile, the proposed chain solution of the present invention 10 allows every link in the chain (the bridges 12 and the transformations 14) to be configured separately or individually (at 20a, . . . n in FIG. 5) and to get that configuration 20 when the data flow reaches it at runtime. This facilitates designing smaller and more focused configurations 20 and allows for composing them for different chains, as shown in FIG. 5.

The Eclipse Modeling Framework (EMF) allows for defining modeling languages using Ecore, a meta-modeling language (an implementation of the EMOF specifications by OMG). These Ecore-based modeling languages are defined in terms of their meta-models. Users then make instances of these meta-models producing user models. Various modeling languages have been designed with Ecore in addition to a set of technologies that accept Ecore-based model instances as their input or output. One notable example here is JET (Java Emitter templates; see eclipse.org article jet-tutorial1.html), which is a model-to-text transformation framework. Another example is BIRT (Business Intelligence and Reporting Tools, see eclipse.org), which is a report design framework. A third example is the Compare & Merge framework, which is available in the IBM Rational Software Architect family of products and helps in comparing and merging Ecore-based models.

Often enough there is a need to transform an Ecore-based user model from one modeling language to another in a chain. Several Ecore-based transformation frameworks exist today including MTAF (Model Transformation Authoring Framework, by IBM Rational Software Architect Version 7.0) and MTF (IBM Model Transformation Framework 1.0.0: Programmer's Guide, 2004 at alphaworks.ibm.com) both of Assignee. These frameworks can be used to implement the specific model-to-model transformation 14 pairs. However, a transformation chain may terminate by consuming the model as an input to another framework like JET (to generate code) or BIRT (to generate reports). It may alternatively terminate by saving the output model or merging it into another persisted model using the Compare & Merge framework. The transformation chain solution 10 presented by the present invention is well-suited to support that kind of chaining.

Figure 6:
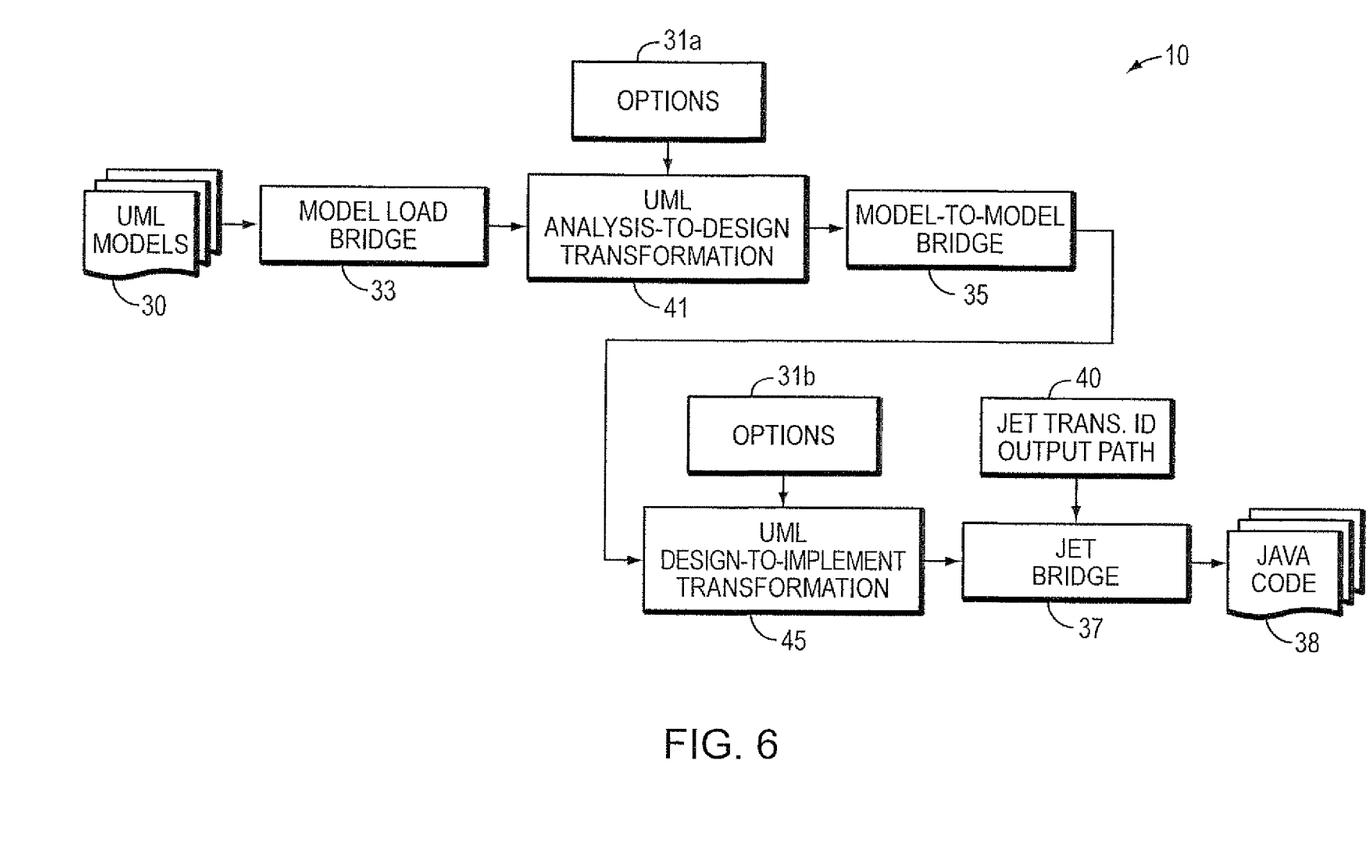
FIG. 6 is a block diagram of an example embodiment of the present invention.

Turning to FIG. 6, Ecore-based models 30 are persisted using XMI (see "MOF 2.0 XMI Mapping Specifications v2.1," OMG Document Format, 05-09-01) and are loaded into memory as EMF Resources. One or more such Resources belong to a Resource Set. Based on that, the input and output of model-to-model transformations 41, 45 can be setup as Resource Sets. The bridges 33, 35, 37 on the other hand may have their inputs, outputs or both as Resource Sets. Table 1 describes the inputs, outputs and configuration parameters for some Ecore-based model-to-model transformations 41, 45 and bridges 33, 35, 37. FIG. 6 shows an example transformation chain involving some of those chain links in a system 10 implementing the present invention.

TABLE 1

Possible chain links for Ecore-based model-to-model transformations

| Chain Link | Configuration | Inputs | Outputs |
|---|---|---|---|
| Model Load Bridge 33 | | Model Files | Resource Set |
| Model-to-Model Bridge 35 | | Resource Set | Resource Set |
| Model-to-Model Transformations 41, 45 | Transformation-defined Parameters 31 | Resource Set | Resource Set |
| Model Validation Bridge | Validation Rules | Resource Set | Resource Set |
| Model Persistence Bridge | Output File Paths | Resource Set | Model Files |
| Model Merge Bridge | Model Files Paths | Resource Set | Model Files |
| JET Bridge 37 | JET Transformation Id Output Folder Path 40 | Resource Set | Text Files |
| BIRT Bridge | BIRT Report Design Path Output Format/Path | Resource Set | Report File |

Optional configuration parameters 31a, b, 40 may be added respectively to transformations 41, 45 and bridges 33, 35, 37 as discussed above in FIG. 5. In the Ecore-based transformation chain of FIG. 6, an example JET configuration parameter 40 is shown providing input to JET bridge 37. The result of the example transformation chain (including bridges 33, 35, 37 transformations 41, 45 and corresponding parameters 31a, b, 40) is an output JAVA code 38.

Figure 7:
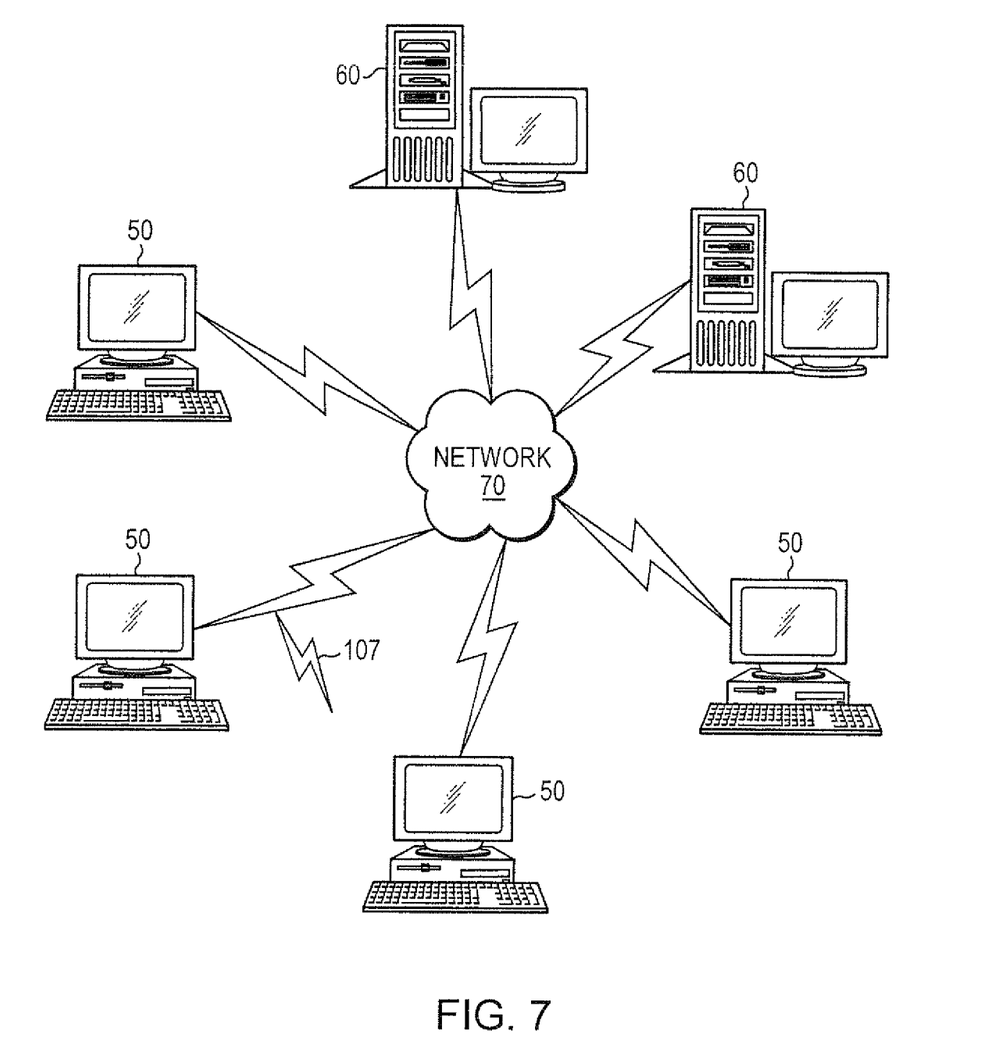
FIG. 7 is a schematic view of a computer network environment in which embodiments of the present invention are implemented.

FIG. 7 illustrates a computer network or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8:
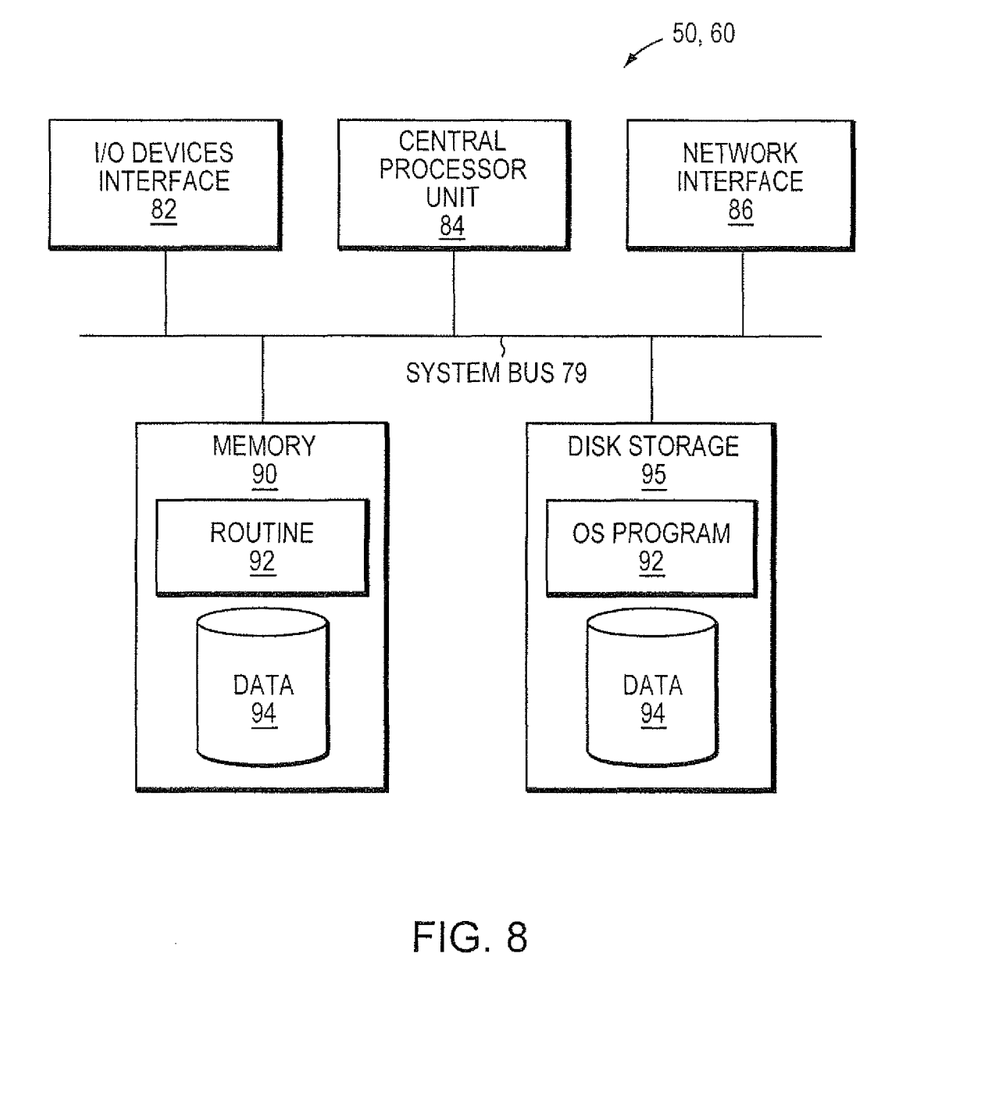
FIG. 8 is a block diagram of a computer node in the computer network of FIG. 7.

FIG. 8 is a diagram of the internal structure of a computer (e.g., client processor 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions 92 and data 94 used to implement an embodiment of the present invention (e.g., bridges 12, transformations 14, and configurations parameters 20 detailed above in FIGS. 5 and 6). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 7 and 8 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

What is claimed is:

1. Computer apparatus for model-to-model transformation, comprising:
   in a processor, a plurality of model transformations, each model transformation receiving models having a respective input model format and generating models having a respective output model format; and
   memory units forming respective bridges between pairs of the model transformations in a series of the model transformations, the bridges eliminating dependencies from one transformation to a next transformation in the series by, for each pair of consecutive model transformations in the series, the respective bridge (i) receiving a model that is output from a first model transformation of the pair, the received model being in the respective output model format of the first model transformation, (ii) preparing the received model as input to a second model transformation of the pair, including preparing the received model to be in the respective input model format of the second model transformation, and (iii) inputting the prepared model to the second model transformation of the pair;
   such that the series of model transformations and respective bridges provide chaining of model-to-model transformations from a platform independent model specifying a respective software system to a platform specific model specifying the software system, wherein each bridge and each model transformation is individually configured, and wherein for each bridge and each model transformation, state of any prior bridges and model transformations in the series is discarded as soon as data flow reaches the bridge such that efficiency in processor execution is increased.

2. Computer apparatus as claimed in claim 1 further comprising a first bridge that loads an initial input model to a model transformation at the beginning of the series.

3. Computer apparatus as claimed in claim 2 wherein the initial input model is a persisted model such that the first bridge loads a persisted input model into memory.

4. Computer apparatus as claimed in claim 2 further comprising a last bridge that outputs a resulting output model from a last model transformation in the series.

5. Computer apparatus as claimed in claim 4 wherein the last bridge saves the resulting output model to storage.

6. Computer apparatus as claimed in claim 1 wherein the bridges include any one or combination of: (i) a bridge that merges transformation output models into persisted models, (ii) a bridge that validates models, (iii) a bridge that provides transformation output models as input models to a consequent model-to-model transformation and (iv) a bridge that provides transformation output models as input models to a model-to-text transformation.

7. Computer apparatus as claimed in claim 6 wherein the model-to-text transformation is a JAVA Emitter Template.

8. Computer apparatus as claimed in claim 6 wherein the model-to-text transformation is BIRT (Business Intelligence and Reporting Tools).

9. Computer apparatus as claimed in claim 1 wherein each model transformation in the series is able to be separately configured.

10. A computer-based method for model-to-model transformation, comprising:
providing a plurality of model transformations, each model transformation receiving models having a respective input model format and generating models having a respective output model format;
forming a series of model transformations from the plurality; and
providing respective bridges between pairs of the model transformations in the series, the bridges eliminating dependencies from one transformation to a next transformation in the series by, for each pair of consecutive model transformations in the series, the respective bridge being a unit configured to (i) receive a model output from a first model transformation of the pair, the received model being in the respective output model format of the first model transformation, (ii) prepare the received model as input to a second model transformation of the pair, including preparing the received model to be in the respective input model format of the second model transformation, and (iii) input the prepared model to the second model transformation of the pair;
such that the series of model transformations and respective bridges provide chaining of model-to-model transformations from a platform independent model specifying a respective software system to a platform specific model specifying the software system, wherein each bridge and each model transformation is individually configured and wherein for each bridge and each model transformation, state of any prior bridges and model transformations in the series is discarded as soon as data flow reaches the bridge such that efficiency of processor execution is increased.

11. A computer method as claimed in claim 10 further comprising:
beginning the series with a first bridge that loads an initial input model to a model transformation at the beginning of the series; and the initial input model being a persisted model such that the first bridge loads a persisted input model into memory.

12. A computer method as claimed in claim 10 further comprising:
ending the series with a last bridge that outputs a resulting output model from a last model transformation in the series.

13. A computer method as claimed in claim 12 wherein the last bridge saves the resulting output model to storage.

14. A computer method as claimed in claim 10 wherein the bridges include any one or combination of: (i) a bridge that merges transformation output models into persisted models, (ii) a bridge that validates models, (iii) a bridge that provides transformation output models as input models to a consequent model-to-model transformation and (iv)) a bridge that provides transformation output models as input models to a model-to-text transformation.

15. A computer method as claimed in claim 14 wherein the model-to-text transformation is a JAVA Emitter Template.

16. A computer method as claimed in claim 14 wherein the model-to-text transformation is BIRT (Business Intelligence and Reporting Tools).

17. A computer method as claimed in claim 10 wherein each model transformation in the series is able to be separately configured.

18. A computer system for providing model-to-model transformation, comprising:
a digital processor having model transformation means providing a plurality of model transformations, each model transformation receiving models having a respective input model format and generating models having a respective output model format; and
bridge means configured in computer memory for providing respective bridges between pairs of the model transformations in a series of the model transformations, the bridges eliminating dependencies from one transformation to a next transformation in the series by, for each pair of consecutive model transformations in the series, the respective bridge being a unit (i) receiving a model output from a first model transformation of the pair, the received model being in the respective output model format of the first model transformation, (ii) preparing the received model as input to a second model transformation of the pair, including preparing the received model to be in the respective input model format of the second model transformation, and (iii) inputting the prepared model to the second model transformation of the pair;
such that the series of model transformations and respective bridges provide chaining of model-to-model transformations from a platform independent model specifying a respective software system to a platform specific model specifying the software system, wherein each bridge and each model transformation is individually configured and wherein for each bridge and each model transformation, state of any prior bridges and model transformations in the series is discarded as soon as data flow reaches the bridge such that efficiency in processor execution is increased.

19. A computer system as claimed in claim 18 wherein each model transformation in the series is able to be separately configured.

20. A computer program product comprising a tangible, non transient computer readable storage medium having a computer readable program, wherein the computer readable program when executed by a computer causes the steps of:
providing a plurality of model transformations, each model transformation receiving models having a respective input model format and generating models having a respective output model format;
forming a series of model transformations from the plurality; and
providing respective bridges between pairs of the model transformations in the series, the bridges eliminating dependencies from one transformation to a next transformation in the series by, for each pair of consecutive model transformations in the series, the respective bridge being a unit configured to (i) receive a model output from a first model transformation of the pair, the received model being in the respective output model format of the first model transformation, (ii) prepare the received model as input to a second model transformation of the pair, including preparing the received model to be in the respective input model format of the second model transformation, and (iii) input the prepared model to the second model transformation of the pair;

such that the series of model transformations and respective bridges provide chaining of model-to-model transformations from a platform independent model specifying a respective software system to a platform specific model specifying the software system, wherein each bridge and each model transformation is individually configured and wherein for each bridge and each model transformation, state of any prior bridges and model transformations in the series is discarded as soon as data flow reaches the bridge such that efficiency of processor execution is increased.

* * * * *